US 7,733,784 B2

(12) United States Patent
Nam et al.

(10) Patent No.: US 7,733,784 B2
(45) Date of Patent: Jun. 8, 2010

(54) APPARATUS AND METHOD OF SELECTING LABEL SWITCHED PATH IN NETWORK MANAGEMENT SYSTEM

(75) Inventors: Hyun Soon Nam, Daejeon (KR); SangSik Yoon, Gwangju (KR); You Hyeon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 583 days.

(21) Appl. No.: 11/634,997

(22) Filed: Dec. 7, 2006

(65) Prior Publication Data

US 2007/0133433 A1 Jun. 14, 2007

(30) Foreign Application Priority Data

Dec. 7, 2005 (KR) .................. 10-2005-0118781
Aug. 21, 2006 (KR) .................. 10-2006-0078799

(51) Int. Cl.
 *H04L 12/26* (2006.01)
(52) U.S. Cl. .................. 370/238; 370/239; 370/240; 370/241
(58) Field of Classification Search .................. 370/238; 709/239, 240, 241
See application file for complete search history.

(56) References Cited

U.S. PATENT DOCUMENTS

| 6,377,551 | B1 | 4/2002 | Luo et al. | |
| 6,584,071 | B1 | 6/2003 | Kodialam et al. | |
| 6,633,544 | B1 * | 10/2003 | Rexford et al. | 370/238 |
| 6,704,320 | B1 * | 3/2004 | Narvaez et al. | 370/408 |
| 7,539,210 | B2 * | 5/2009 | Iovanna et al. | 370/468 |
| 2002/0120766 | A1 * | 8/2002 | Okajima et al. | 709/232 |

FOREIGN PATENT DOCUMENTS

| KR | 1020040028331 | 4/2004 |
| KR | 10-2005-0038649 | 4/2005 |
| KR | 1020050040144 | 5/2005 |

OTHER PUBLICATIONS

Guo, Yile, Zoe Antoniou, and Sudhir Dixit, "IP Transport in 3G Radio Access Networks: an MPLS-based Approach", 2002 IEEE, pp. 11-17.*
Iwata et al.; "A Hierarchical Multilayer QoS Routing System with Dynamic SLA Management"; IEEE; Dec. 2000; pp. 2603-2616.

* cited by examiner

*Primary Examiner*—Ricky Ngo
*Assistant Examiner*—Luat Phung
(74) *Attorney, Agent, or Firm*—Lowe Hauptman Ham & Berner LLP

(57) ABSTRACT

In an apparatus and method of selecting a label switched path (LSP) in a network management system, a status analyzing unit analyzes and digitizes performance information, fault occurrence, and fault history of a link. A link weight managing unit which determines link weight values using a predetermined weight calculation algorithm on second constraints that corresponds to qualitative information related to performance analysis of a path. An LSP selecting unit selects a path, from among paths on a path list, that satisfies first constraints which corresponds to objective information related to a path selection required by the administrative network policy, and, when there are several selected paths, selects a path that minimizes expense using the link weight values.

13 Claims, 4 Drawing Sheets

FIG. 2

FIRST CONSTRAINTS (BASIC CONSTRAINTS)

| ■ BANDWIDTH<br>■ QUALITY (DELAY)<br>■ LINK AFFINITY<br>■ EXPLICIT PATH<br>■ NODE EXCLUSION/INCLUSION | Used as real-time constraints with S and D in LSP selecting unit. All given first constraints should be satisfied. |

SECOND CONSTRAINTS (PRACTICAL CONSTRAINTS) - PRIORITY APPLIED

| ■ VIGOROUSNESS OF LINK<br>  - LINK TYPE<br>■ LOAD BALANCING OF LINK<br>  - UTILIZATION<br>■ STABILITY OF LINK<br>  - FAULT HISTORY, PERFORMANCE ANALYSIS | Link weight managing unit adds and subtracts link weight in a ratio of 3:2:1 according to priority. For example, when load balancing has the highest priority, link weight is adjusted in the biggest ratio (3) according to link utilization. |

FIG. 3

$R_k$ : PREDETERMINED PATH k
cnt : Hop count
$l$ : Link
$l^{wt}$ : LINK WEIGHT
$R_k(l_{cnt})$ : LINK LIST WHICH PREDETERMINED PATH K PASSES
$C^{R_k}$ : EXPENSE WHERE PREDETERMINED
       PATH K REFLECTS LINK WEIGHT (201)

$$C^{R_k} = (\sum_{i=0}^{cnt} R_k(l_i^{wt})) * \frac{1}{cnt} + cnt \quad (200)$$

APPARATUS AND METHOD OF SELECTING LABEL SWITCHED PATH IN NETWORK MANAGEMENT SYSTEM

CROSS-REFERENCE TO RELATED PATENT APPLICATION

This application claims the benefit of Korean Patent Application No. 10-2005-0118781, filed on Dec. 7, 2005 and Korean Patent Application No. 10-2006-0078799, filed on Aug. 21, 2006, in the Korean Intellectual Property Office, the disclosures of which are incorporated herein in their entirety by reference.

BACKGROUND OF THE INVENTION

1. Field of the Invention

The present invention relates to an apparatus and method of selecting a label switched path (LSP) in a network management system, and more particularly, to an apparatus and method of selecting an LSP from an ingress node to an egress node in a multi protocol label switch (MPLS) system, where constraints are reflected in a network status. The apparatus and method are practical in terms of increasing reliability and adaptability of the network, since a path is calculated by arbitrating priority between network policies.

2. Description of the Related Art

One conventional technology is searching for a path, having various constraints, such as constraints on bandwidth, delay, etc., combined with a Dijkstra's algorithm, which is a method of selecting a shortest path. The current conventional technology has been used as a path selection algorithm for a routing protocol called OSPF-TE (open shortest path first-traffic engineering), and exchanges information about a status of an adjacent network in order to obtain more accurate information about a status of an adjacent network. An example of the current conventional technology is a method of selecting a path based on quality of service (QoS), which calculates and selects the path based on the expense and delay of a link. However, in the current conventional technology, processing selecting path is difficult when constraints conflict, and the network is loaded due to flooding information between devices.

Another conventional technology is a method of supporting a label switched path (LSP) from an ingress node to an egress node with a service level agreement (SLA). The method sets the LSP, monitors the status of a link and utilization of the link, and re-arbitrates the set LSP in a centralized network management system. In the current conventional technology, a load generated while exchanging information, that is to be transmitted to each node, is reduced using the centralized network management system so as to ensure high efficiency of path calculation. However, the conflict between the constraints cannot be suitably controlled.

SUMMARY OF THE INVENTION

The present invention provides an apparatus and method of selecting a label switched path (LSP) from an ingress node to an egress node in a multi protocol label switch (MPLS) system, where constraints are reflected in a network status. The apparatus and method are practical in terms of increasing reliability and adaptability of the network, since a path is calculated by arbitrating priority between network policies.

The present invention also provides a computer readable recording medium having recorded thereon a program for executing the method of selecting an LSP.

According to an aspect of the present invention, there is provided an apparatus for selecting a label switched path (LSP), the apparatus comprising: a status analyzing unit which analyzes and digitizes performance information, a fault occurrence, and a fault history of a link in order to convert the performance information, the fault occurrence, and the fault history into standardized values; a link weight managing unit which determines link weight values using values obtained by adding and subtracting reference values, calculated using a predetermined weight calculation algorithm on second constrains that corresponds to qualitative information related to performance analysis of a path required by an administrative network policy, to and from the standardized values of the status analyzing unit; and an LSP selecting unit which prepares a route list by using a method of executing a predetermined background task by appointing a source and a destination from among all nodes in the administrative network, selects a path, from among paths on the route list, that satisfies first constrains which corresponds to objective information related to a path selection required by the administrative network policy, and, when there are several selected paths, selects a path that minimizes expense using the link weight values.

The performance information of the link provided to the status analyzing unit may be periodical performance information or a performance threshold.

The status analyzing unit may include: a link status analyzing unit which digitizes the performance information and the fault history by determining utilization of the link; and an LSP status analyzing unit which measures and digitizes delay information of the LSP.

The first constraints, required by the administrative network policy, may include a bandwidth, delay, link affinity, explicit path, and node exclusion/inclusion.

The second constraints, which calculate the reference values in the administrative network policy of the link weight managing unit, may include vigorousness, load balancing, and stability of the link.

The link weight managing unit may determine priority between the vigorousness, the load balancing, and the stability of the link based on the administrative network policy and may determine the link weight values by using the reference values digitized in a ratio of 3:2:1 from the highest priority to the lowest priority.

The LSP selecting unit may select a path that minimizes expense using the link weight values reflecting the priority, when a plurality of paths satisfying the first constraints exists.

According to another aspect of the present invention, there is provided a method of selecting an LSP, the method including: analyzing and digitalizing performance information, a fault occurrence, and a fault history of a link in order to convert the performance information, fault occurrence, and fault history into standardized values; determining link weight values using values obtained by adding and subtracting reference values, calculated using a predetermined weight calculation algorithm on second constraints that correspond to qualitative information related to performance analysis of a path required by an administrative network policy, to and from the standardized values; and preparing a path list by using a method of executing a predetermined background task by appointing a source and a destination from among all nodes in the administrative network, selecting a path, from among paths on the path list, that satisfies first constraints which corresponds to objective information related to a path selection required by the administrative network policy, and, when there are several selected paths, selecting a path that minimizes expense using the link weight values.

According to another aspect of the present invention, there is provided a computer readable recording medium having recorded thereon a program for executing the method described above.

BRIEF DESCRIPTION OF THE DRAWINGS

The above and other features and advantages of the present invention will become more apparent by describing in detail exemplary embodiments thereof with reference to the attached drawings in which:

FIG. 2 is a conceptual schematic illustrating constraints required by an administrative network policy and reference values provided by the administrative network policy according to an embodiment of the present invention;

FIG. 3 is a diagram illustrating an expense calculation for selecting an LSP according to an embodiment of the present invention;

DETAILED DESCRIPTION OF THE INVENTION

Hereinafter, the present invention will be described more fully with reference to the accompanying drawings, in which exemplary embodiments of the invention are shown.

Figure 1:
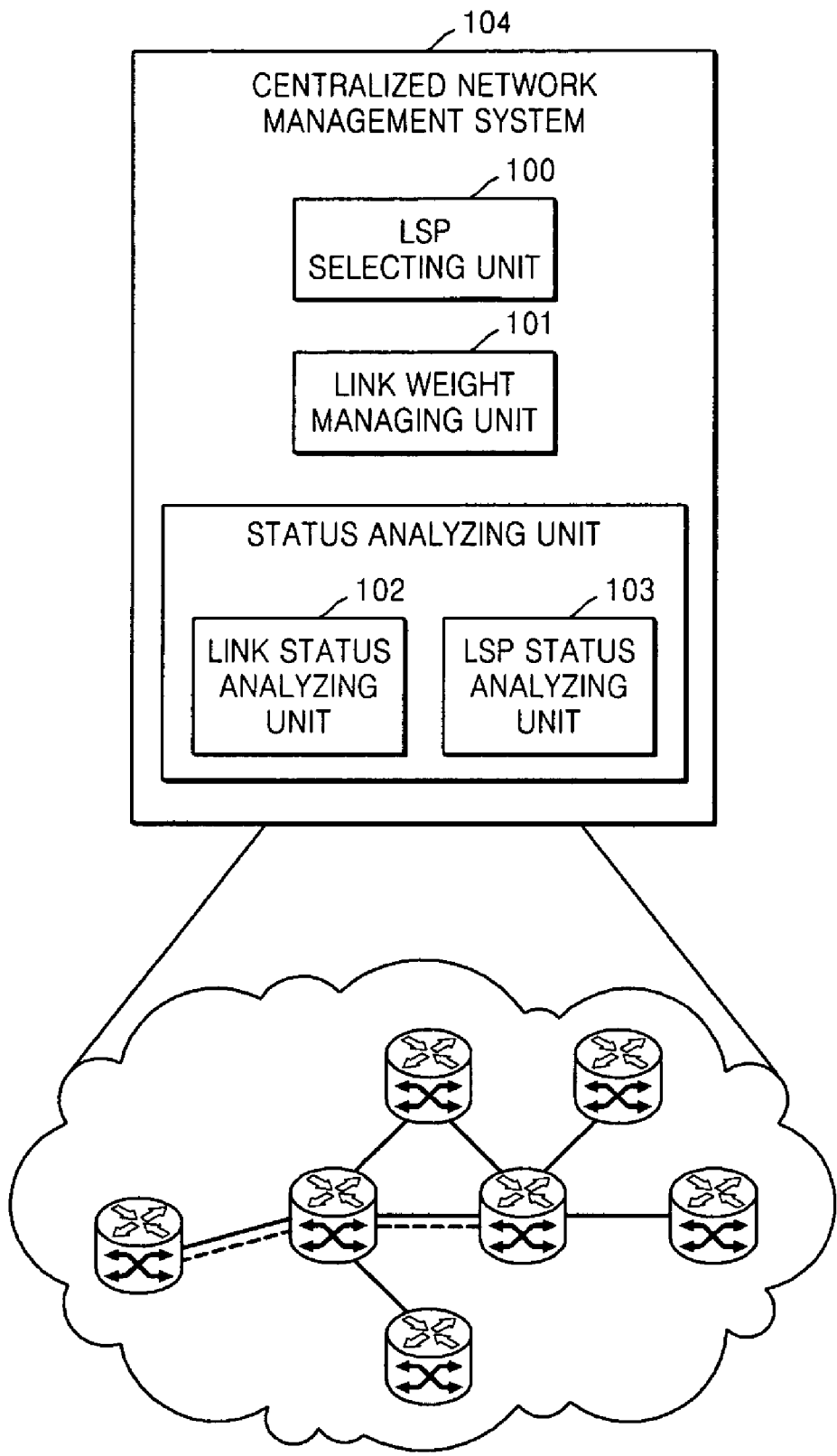
FIG. 1 is a diagram illustrating an apparatus for selecting a label switched path (LSP) according to an embodiment of the present invention.

FIG. 1 is a diagram illustrating an apparatus for selecting a label switched path (LSP) according to an embodiment of the present invention. Referring to FIG. 1, the apparatus includes an LSP selecting unit 100, a link weight managing unit 101, a link status analyzing unit 102, and an LSP status analyzing unit 103 installed in a centralized network management system 104.

Since the apparatus according to the current embodiment is located in the centralized network management system 104, it is easy to analyze a status of the network and reflect the status in the selection of a path. When path selecting blocks are decentralized to each node, load balances unlike the centralized network management system 104. However, as requirements for a high quality service, such as a multimedia application service like voice and video, that needs to support a quality of service (QoS), increase, detailed data for analyzing a status of a network also increases. Accordingly, the network is loaded due to a sudden increase in the amount of data between all the path selecting blocks. Also, complicated blocks for analyzing the detailed data are required in all nodes, which increases the price of the units. Accordingly, the apparatus according to the current embodiment is located in the centralized network management system 104.

The link status analyzing unit 102 and the LSP status analyzing unit 103 analyze and digitize performance information, a fault occurrence, and a fault history in order to change the performance information, the fault occurrence, and the fault history into standardized values.

The link weight managing unit 101 determines link weight values using values obtained by adding and subtracting reference values, provided by an administrative network policy, to and from the standardized values.

The LSP selecting unit 100 performs a background task of preparing a path list using a heuristic depth first search (DFS) method by appointing a source and a destination from among all nodes in the administrative network, and selects a path, from among paths on the path list, that satisfies constraints required by the administrative network policy.

FIG. 2 is a conceptual schematic illustrating constraints required by an administrative network policy and reference values provided by the administrative network policy according to an embodiment of the present invention. Referring to FIG. 2, the constraints are classified into first constraints and second constraints.

Basic constraints, such as bandwidth, quality (delay), link affinity, explicit path, node exclusion/inclusion, etc. requested while selecting the LSP are defined to be the first constraints. A plurality of the first constraints may be requested, and all elements of the plurality of first constraints should be satisfied.

Practical constraints, such as link type, fault history, performance analysis, utilization for load balancing, etc. are defined to be the second constraints. In the second constraints, a constraint having a higher priority controls link weight to a greater degree than a constraint having a lower priority. Accordingly, the second constraints function as a variable while selecting the path.

FIG. 3 is a diagram illustrating an expense calculation for selecting an LSP according to an embodiment of the present invention. The expense calculus will be described later while describing FIG. 4.

Figure 4:
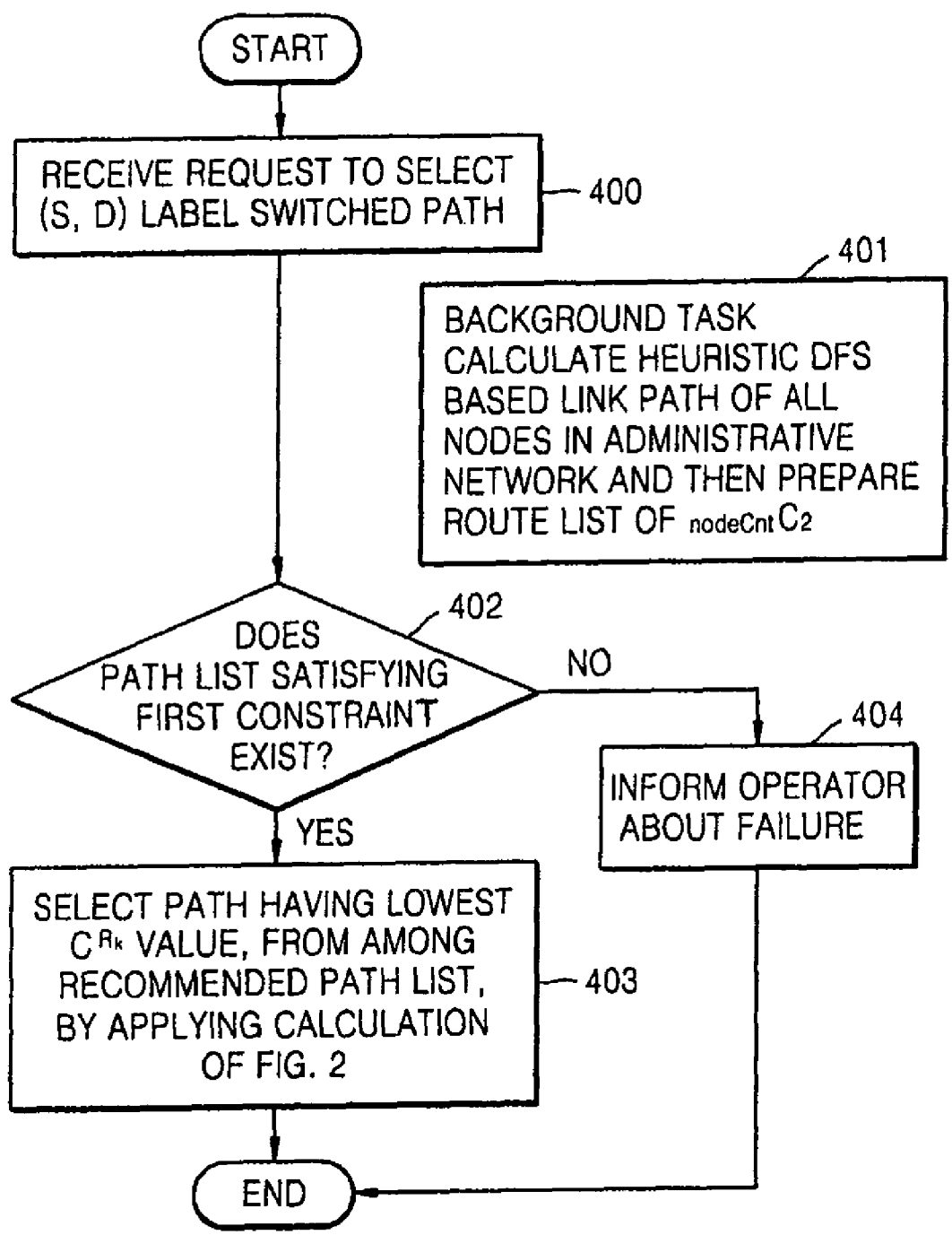
FIG. 4 is a flowchart illustrating a method of selecting an LSP according to an embodiment of the present invention.
Figure 5:
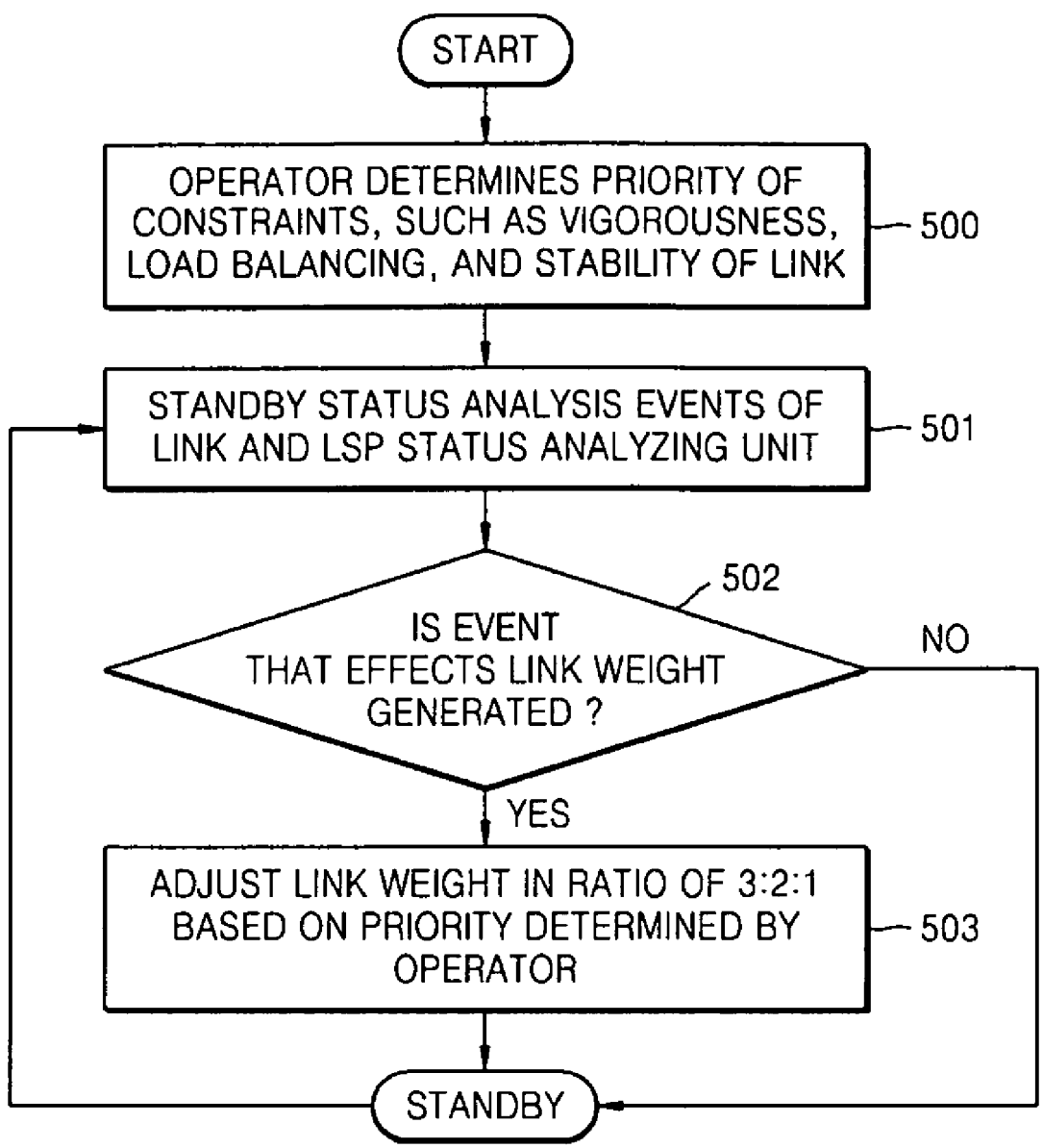
FIG. 5 is a flowchart illustrating a method of selecting an LSP, applying a link weight using reference values provided by an administrative network policy, according to an embodiment of the present invention.

FIG. 4 is a flowchart illustrating a method of selecting an LSP according to an embodiment of the present invention, and FIG. 5 is a flowchart illustrating a method of selecting an LSP, applying a link weight using reference values provided by an administrative network policy, according to an embodiment of the present invention. FIGS. 4 and 5 will be described with reference to FIG. 1, while describing functions of each of the constitutions of FIG. 1.

The LSP selecting unit 100 performs a background task and a real-time task. In the background task, a full mesh path list is prepared using the heuristic DFS method by appointing a source (S) and a destination (D) from among all nodes in the administrative network (operation 401). $_nC_2$ is the number of items that are formed in the full mesh paths of the predetermined S and D, when the total number of nodes is n. A plurality of path lists can exist in each item of the full mesh paths of the predetermined S and D. The real-time task is performed when a request for selecting paths to the S and D is received in operation 400. At this time, at least one first constraint can be included in the request. In operation 402, it is determined whether a path satisfying the given first constraint exists in the path lists.

When a plurality of paths satisfying the given first constraints exists, a path is selected using an expense 201 illustrated in FIG. 3, i.e., a value 200 of FIG. 3 reflecting the priority of the second constraints. When a plurality of paths having the same value 200 exists, a path having the lowest hop count is selected. When the plurality of paths having the same value 200 does not exist, it informs about link failure to administrator in operation 404.

The link weight according to the current embodiment is classified into values in 10 grades, i.e. 1 through 10. The lower the value of the link weight, the higher the priority in selecting the link. A reference value is given to the link weight first, and is added and subtracted based on a status of the network, according to the request from an operator. The operator determines priority between the second constraints, such as vigorousness, load balancing, stability, etc. of the link in operation 500.

For example, when the vigorousness of the link has the highest priority, a link set with a 1+1 line switching, from among the link type, is given the lowest value and other links are given the reference values. Accordingly, the link set with the 1+1 line switch has priority in selecting a link. Also, a section where a switch of a layer 1 is applied, the lowest value is given in order to have priority in selecting a link.

When the load balancing of the link has the highest priority, utilization of the link is analyzed in order to widen the range of adding and subtracting of the link weight. Accordingly, the link having the lowest utilization has the higher priority.

When the stability of the link has the highest priority, the performance information and the fault history is analyzed in order to give the lowest value to the link weight of a link having the lowest performance limit excess or lowest fault history frequency, so that this link has priority in selecting a link. When the priority of the above described 3 second constraints is determined, an adding and subtracting range of the link weight is regulated in the ratio of 3:2:1, from the highest priority to the lowest priority (operation 503).

The link weight, regulated dynamically, functions as an important variable in the expense calculation of FIG. 3, and a path is selected using the link weight. The link weight managing unit 101 receives events of the link status analyzing unit 102 and the LSP status analyzing unit 103 in operation 501 and prioritizes the events as described above. After the operator determines the priority between the second constraints, the link weight managing unit 101 performs the background task and a value of the link weight managing unit 101 is applied in selecting a path while the LSP selecting unit 100 performs the real-time task (operation 403).

The link status analyzing unit 102 analyzes and converts periodical performance information, a performance threshold, a fault occurrence, and a fault history into standardized values in order to provide the standardized values as data, used in adding and subtracting the link weight, to the link weight managing unit 101 in operation 502. Also, the link status analyzing unit 102 generates events in the link weight managing unit 101 while changing the status of the link. The link status analyzing unit 102 balances the load of the link using the utilization of the link and stabilizes the link using the fault history, performance information, etc.

The LSP status analyzing unit 103 analyzes and converts the periodical performance information, performance threshold, fault occurrence, and fault history into standardized values in order to provide the standardized values as data, used in adding and subtracting the link weight, to the link weight managing unit 101. Also, the LSP status analyzing unit 103 generates events in the link weight managing unit 101 while changing the status of the link. Delay information of a predetermined LSP can be obtained from the LSP status analyzing unit 103. The delay information can be applied in setting the following LSP, or in re-setting the LSP when the appointed LSP does not correspond to the administrative network policy.

An embodiment of the present invention provides a method of selecting an LSP by prioritizing practical constraints and various other constraints based on properties of a network. In order to select the LSP in a multi protocol label switch (MPLS) system, basic constraints for QoS, such as a bandwidth, link affinity, delay, explicit path, and node exclusion/inclusion, and practical constraints, such as a link type, fault history, performance analysis, utilization for load balancing, etc. are extracted in order to be prioritized. Accordingly, the LSP is selected based on the selection by the operator and the network management mechanism.

Values of the link weight are network synthesized and then added and subtracted according to the status of the network, in order of priority. Accordingly, a path is calculated using such a dynamic link weight. The path is calculated using the heuristic DFS. Each of the constraints of the method according to the current embodiment has priority compared to the conventional method. Accordingly, different paths can be selected based on a path operation policy, which provides flexibility in managing the path. Also, the link weight is dynamically regulated based on the status of the network, and thus a practical path can be selected.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage device. The computer readable recording medium can also be distributed over network coupled computer systems so that the computer readable code is stored and executed in a distributed fashion.

According to the present invention, network policies are standardized as constraints in order to be reflected in the selection of a path. The status of the network is analyzed based on the constraints, in order to add and subtract the link weight. Accordingly, a practical path suitable for the status of the network can be selected. The present invention has the following properties.

First, constraints are classified into first constraints and second constraints and thus the network policies can be evenly reflected in the LSP.

Second, the link weight is dynamically added and subtracted by analyzing the status of the network, and thus a practical optimum LSP according to the status of the network can be selected.

Third, the LSP is selected by placing priority on a network operation policy of an operator, and thus conflicts between the policies can be prevented. Accordingly, it is easy to automatically select the LSP.

Fourth, practical delay information is extracted by analyzing a status of a link and LSP, and thus the path can be calculated based on relatively accurate delay information.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for selecting a label switched path (LSP) from a source to a destination among a plurality of nodes connected by a plurality of links in an administrative network, the apparatus comprising:

a status analyzing unit which analyzes and digitizes performance information, a fault occurrence, and a fault history of each link in order to convert the performance information, the fault occurrence, and the fault history into standardized values;

a link weight managing unit which determines link weight values based on reference values, wherein said reference values are calculated: using a predetermined weight calculation algorithm, based on (a) second constraints related to a performance analysis of a path as required by the administrative network's policy, and (b) the standardized values provided by the status analyzing unit; and an LSP selecting unit which (i) prepares a route list of paths from the source to the destination by using a method of executing a predetermined background task, (ii) selects at least a path, from among the paths on the route list, that satisfies first constraints related to a path selection as required by the administrative network's policy, and (iii) selects, when there are several paths that satisfy the first constraints, a path that minimizes expense, wherein said expense is calculated using the link weight values.

2. The apparatus of claim 1, wherein the performance information of the link provided to the status analyzing unit is periodical performance information or a performance threshold.

3. The apparatus of claim 1, wherein the status analyzing unit comprises:

a link status analyzing unit which digitizes the performance information and the fault history by determining utilization of the link; and an LSP status analyzing unit which measures and digitizes delay information of the LSP.

4. The apparatus of claim 1, wherein the first constraints comprise a bandwidth, a delay, a link affinity, an explicit path, and node exclusion/inclusion.

5. The apparatus of claim 1, wherein the second constraints comprise vigorousness, load balancing, and stability of the link.

6. The apparatus of claim 5, wherein the link weight managing unit determines priority among the vigorousness, the load balancing, and the stability of the link based on the administrative network's policy, and determines the link weight values by using the reference values calculated according to the priority.

7. The apparatus of claim 6, wherein the expense is calculated using the total of risks of links passing through paths reflecting the link weight values, and hop counts.

8. The apparatus of claim 6, wherein the LSP selecting unit selects a path having the lowest hop count, when a plurality of paths that minimize expense exist.

9. A method of selecting an LSP (label switched path) from a source to a destination among a plurality of nodes connected by a plurality of links in an administrative network, the method comprising:

analyzing and digitizing performance information, a fault occurrence, and a fault history of each link in order to convert the performance information, the fault occurrence, and the fault history into standardized values;

determining link weight values based on reference values, wherein said reference values are calculated, using a predetermined weight calculation algorithm, based on (a) second constraints related to a performance analysis of a path as required by the administrative network's policy, and (b) the standardized values; and preparing a path list of paths from the source to the destination by using a method of executing a predetermined background task, selecting at least a path, from among the paths on the path list, that satisfies first constrains related to a path selection as required by the administrative network's policy, and selecting, when there are several paths that satisfy the first constraints, path that minimizes expense, wherein said expense is calculated using the link weight values.

10. The method of claim 9, wherein the analyzing and digitizing comprises:

digitizing the performance information and the fault history by determining utilization of the link; and measuring and digitizing delay information of the LSP.

11. The method of claim 9, wherein the first constraints comprise a bandwidth, a delay, a link affinity, an explicit path, and a node exclusion/inclusion, and the second constraints comprise vigorousness, load balancing, and stability of the link.

12. The method of claim 11, further comprising:

determining priority among the vigorousness, the load balancing, and the stability of the link based on the administrative network's policy, and wherein the link weight values are determined by using the reference values calculated according to the priority.

13. A computer readable recording medium having recorded thereon a program for causing a computer to execute the method of claim 9.

* * * * *